April 9, 1968 S. V. CHELMINSKI 3,376,723
METHODS AND APPARATUS FOR FORMING MATERIAL BY SUDDEN IMPULSES
Filed Aug. 16, 1965 4 Sheets-Sheet 3

INVENTOR.
STEPHEN V. CHELMINSKI
BY
Robertson, Smythe, Bryan & Parmelee
ATTORNEYS.

United States Patent Office 3,376,723
Patented Apr. 9, 1968

3,376,723
METHODS AND APPARATUS FOR FORMING MATERIAL BY SUDDEN IMPULSES
Stephen V. Chelminski, Redding, Conn., assignor to Bolt Associates, Inc., East Norwalk, Conn., a corporation of Connecticut
Filed Aug. 16, 1965, Ser. No. 479,771
14 Claims. (Cl. 72—56)

This invention relates to methods and apparatus for forming materials by sudden impulses, and particularly to such methods and apparatus for forming or shaping materials by the creation of sudden high energy impulses in a liquid adjacent to the material to be formed. The methods and apparatus of the present invention are well suited for forming various materials, such as metals and alloys, which are capable of being plastically deformed by the application of high energy pressure waves thereto.

In accordance with this invention the material to be formed is placed adjacent to a liquid, a gas is confined under high pressure and then the gas is abruptly released for generating a high energy, intense pressure impulse in the liquid so as to produce the desired shaping of the material. Additional gas is confined under high pressure and is released to provide a successive high energy impulse if desired to produce further shaping of the material. The liquid itself may be pre-pressurized. This invention is adaptable to form the material into, against, or around a die and is also adaptable for the various ways of forming materials, for example, such as by bulging, stretching, compacting, extruding, drawing, sizing, expanding, or shrinking.

While explosives have been used to put a high energy intense pressure impulse into a liquid for forming materials, they do have drawbacks. They are dangerous to handle and use, and a substantial cost is involved in the explosives and detonating devices which are consumed. Also, in the past electrical discharges through a wire have been used to create pressure impulses in a liquid for forming materials. These discharges require high voltage and large currents provided from numerous bulky, expensive electrical capacitors arranged in a bank. The wire itself is vaporized by the discharge, so the equipment must be opened up to replace the wire in the liquid after each "shot." The same requirement of opening up the equipment to replace a consumed energy source is a drawback of using explosives.

Among the many advantages of the material forming methods and apparatus which are described herein as illustrative of the present invention are those resulting from the fact that they are very versatile in application; they are safer and much more convenient to use than explosives or high voltage discharges. Low tooling and low operating costs are provided by these embodiments of the invention. There are no expendable parts to be removed, discarded and replaced after each impulse. Also, a rapid cycle time is enabled to be attained so that the intense impulses can be supplied at frequent intervals, for example such as every two seconds for producing successive deformations of heavy sections. When large pieces of material are being formed, several consecutive impulses can be applied to the piece to produce progressive shaping of the piece while it remains held in place in the apparatus. Moreover, the illustrative methods and apparatus are easy control, and the relative amount of energy released in each successive impulse can be varied as may be desired in a sequence to provide various forming effects. In addition it is noted that the illustrative apparatus is adaptable to be used with present presses so that it can be applied as an attachment in many types of existing equipment.

It is an object of the present invention to provide improved methods and apparatus for the high energy rate forming of materials.

A further object of this invention is to provide methods and apparatus for the high energy rate forming of materials which are advantageous and convenient to be used in a wide variety of applications.

In this specification and in the accompanying drawings, are described and shown illustrative embodiments of my invention in methods and apparatus for forming materials by sudden impulses and various modifications thereof are indicated, but it is to be understood that these are not intended to be exhaustive nor limiting of the invention, but on the contrary are given for purposes of illustration in order that others skilled in the art may fully understand the invention and the manner of applying the method and apparatus in practical use and so that they will understand how to modify and adapt these methods and apparatus in various forms, each as may be best suited to the conditions of a particular use.

The various objects, aspects, and advantages of the present invention will be more fully understood from a consideration of the following specification in conjunction with the accompanying drawings, in which.

Figure 1:
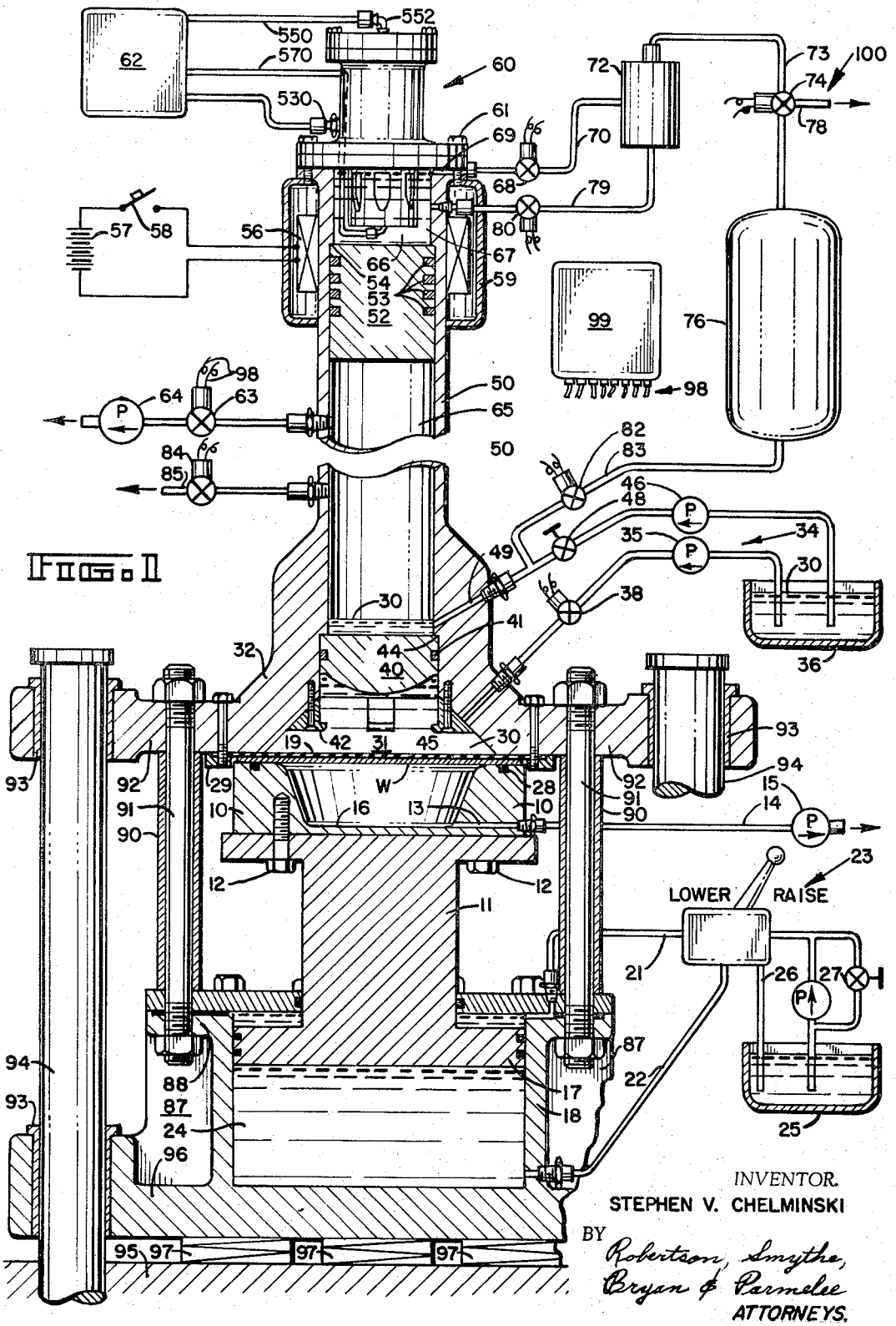
FIGURE 1 is an elevational sectional view of apparatus embodying the present invention and for carrying out the process of the present invention, with certain control circuits being schematically illustrated.

In the illustrative embodiment shown in FIGURE 1, the work material to be formed is shown as a plate of metal W. This work material W is clamped adjacent to a die 10 detachably secured to movable support means 11 by bolts 12. There is a suction passage 13 in the die 10 connected by a line 14 to a pump 15 for evacuating air from the region near the die surface 16. This pump 15 withdraws air from beneath the work W before the work is formed against the die surface 16. A large double acting piston 17 in a cylinder 18 serves to clamp the work W up against a flexible diaphragm 19 shown as a rubber sheet.

Control means 20 are connected to the cylinder 17 by hydraulic lines 21 and 22 so as to raise and lower the die 10. A pressure source 23 for the hydraulic liquid 24 is shown as a pump P connected from a reservoir sump 25 to the control means 20, and a discharge is provided from the control means 20 back through a line 26 to the reservoir. The pump P has a by-pass pressure regulator 27 so as to set the maximum pressure of the hydraulic liquid delivered from the pressure source means 23. Extending around the rim of the die 10 in a channel is a sealing gasket 28, and a frame 29 secures the diaphragm 19 in place.

In order to apply an intense high pressure impulse to the work W, there is a substantially incompressible fluid 30, for example, such as water, oil, hydraulic liquid, or the like, held by a chamber 31 in a very strong high pressure container 32. This container 32 is in opposed relationship to the die 10 with the work W positioned therebetween. In operation the incompressible fluid 30 is placed under an initial high pressure by pressure source means 34 including a high pressure pump 35 supplied from a reservoir 36 and connected through a valve 38 into the chamber 31. By raising the pressure in the chamber 31 to an initial high level, while the die 10 has been evacuated by the pump 15, the work W is pre-stressed almost to its yield point.

The liquid 30 is held in the chamber 31 by a piston 40 which serves as means for transmitting an intense impulse into the liquid 30. The pulse transmitting means 40 includes sealing means 41 shown as a piston ring, this transmitting means 40 being adapted to be driven downwardly toward the diaphragm 19. A plurality of retainers 42 prevent the pulse transmitting piston 40 from falling completely into the chamber 31 before it is pressurized. When this chamber is pre-pressurized, the piston 40 rests up against stop means 44 shown as an internal shoulder. A small quantity of incompressible liquid 30 may be introduced into the container 32 on top of the piston 40 by a pump 46 and a valve 48 feeding through a passage 49.

There is a long acceleration cylinder 50 extending down into the high pressure container 32. Within this cylinder 50 is a massive piston 52 having a plurality of sealing rings 53. This piston 52 is mounted for free travel in the long cylinder 50 and is adapted to be accelerated to a very high velocity therein.

The purpose of this massive piston 52 and the functionally associated elements of this apparatus, as will be explained in detail, is to transform a first pressure impulse $I_1$ having a first pressure level $P_1$ and a first period of time duration $T_1$ into a second pressure impulse $I_2$ having a second pressure level $P_2$ which is many fold higher than $P_1$ and with a second period of time duration $T_2$ which is many fold shorter than $T_1$.

Before this piston 52 is accelerated, it is held stationary against a stop shoulder 54 by energization of electromagnetic coil means 56 surrounding the cylinder 50. This coil 56 is energized from an electrical source 57 when a switch 58 is in its closed position. The piston 52 is made of magnetically permeable material, for example steel, and a permeable housing 59 surrounds the coil 56 so as to provide a low reluctance return path for the magnetic flux.

While this impulse transformer piston 52 is being held against the stop 54, the valves 38 and 48 are closed, and an apparatus 60 for abruptly releasing gas is charged up with gas under high pressure, for example from 1000 to 10,000 p.s.i. This apparatus 60 is attached to the upper end of the cylinder 50 and is shown in detail in FIGURE 4 together with the control and high pressure gas supply means which are generally indicated at 62 in FIGURE 1.

At the same time as the gas release apparatus 60 is being charged, a vacuum pump 64 serves to evacuate the bore 65 of the long cylinder 50. The purpose of this evacuation is to reduce substantially the amount of gas in the bore 65 between the pistons 52 and 40 so as to maximize the ultimate velocity of the piston 52. Also, this absence of gas in the bore 65 increases the shock which is created at the instant of impact of the piston 52 against the small layer of liquid 30 over the piston 40.

When it is desired to produce the high energy impulse for forming the work W, the control and supply means 62 is actuated, causing the gas-release apparatus 60 to abruptly release a large quantity of high pressure gas into a release region 66 at the top of the long cylinder 50 directly above the piston 52. This release region 66 contains a liquid 67 for the purpose, among others, of reducing the available volume for the gas to enter, thus maximizing the initial pressure level. This abrupt release of high pressure gas into the region 66 accelerates the piston 52 down the bore 65 with a great rate of acceleration so as to attain a high velocity during its free travel along this cylinder.

As the massive piston 52 impacts at very high velocity against the liquid 31 above the piston 40, this latter piston is driven substantially instantaneously down into the chamber 30 so as to create an intensely high pressure shock wave therein which forms the work W against the die surface 16.

In order to return the piston 52 to its initial position, a valve 68 is opened so as to allow the gas in the bore 65 to escape through a top passage 69 and through a line 70 into a gas-liquid separator 72. The gas passes out of the top of separator 72 and down through a line 73 and through a two-way valve 74 and through a line 75 into a pressure storage tank 76. As soon as pressure equilibrium between the bore 65 and tank 76 is reached, then the two-way valve 74 is turned so as to shut off the line 75 while connecting the line 73 to a discharge pipe 78. This allows the remaining gas to escape from the bore 65 bringing the bore pressure down to atmospheric pressure. A valve 80 is also opened to allow any of the liquid 67 to drain down from the separator 72 back into the cylinder 50 into the region 66 above the piston 52.

Now that the bore 65 is down to atmospheric-pressure, a valve 82 is opened so that the gas stored under pressure in the tank 76 passes through a line 83 and through the passage 49 into the lower end of the bore 65. This raises the pressure beneath the piston 52 so as to lift it back up into its initial position where it is held by the electromagnet 56.

As soon as the piston 52 has been returned to its initial upper position, the valve 82 is actuated to shut off the line 83, and a valve 84 is opened so as to discharge the gas from the bore 65 through a pipe 85. This valve 84 and also the valves 68 and 80 are all closed before the vacuum pump 64 is operated.

It is noted that the top passage 69 is positioned up at the top so as to allow all of the gas to escape from the region 66 while the piston 52 is being lifted up the bore 65. Also, there is sufficient liquid 67 to fill both of the lines between the region 66 and the valves 68 and 80. Thus, there is substantially no gas available in the region 66 to push down on the piston 52 when the bore 65 is being evacuated by the pump 64.

If the work W requires more than one high energy impulse to complete its forming operation, then the cycle is repeated, including the step of opening the valve 38 so as to introduce sufficient liquid 30 into the chamber 31 to pre-pressurize this chamber.

When the forming operation is complete, the control 20 is operated to lower the disc 10 for removing the work and inserting a new plate W to be formed.

The cylinder 18 is braced by a plurality of web members 87 having a large flange 88. This flange 88 is rigidly fastened by means of spacer tubes 90 and large tension bolts 91 connected to a large mounting frame 92 at the lower end of the high pressure container 32. The mounting frame 92 is slidingly secured by sleeve bearings 93 to a plurality of rigid columns 94 which are anchored in a foundation 95. Similarly, a base 96 on the cylinder 18 is slidably secured by sleeve bearings 93 to these same columns. For reducing undesired vibrations or tremors in the foundation 95, the base 96 is supported by a plurality of shock-absorbing pads 97 set on the foundation 95. Also, the slidable bearings 93 allow the whole machine to move up and down as the vibration and tremors are absorbed by the shock-absorbing pads 97. For example, these pads may be formed of alternating layers of lead, asbestos and steel plates.

It is noted that the piston 40 has a convex forward surface 45 facing into the chamber 30. The purpose of this convex surface is to direct the intense shock pressure wave toward the entire area of the diaphragm 19 so that this high energy pressure shock wave is applied to the whole of the work W to be formed thereby. The action of the impulse transformer piston 52 in its high velocity impact against the liquid layer 31 is to transform the original pressure level $P_1$ which occurred in the region 66 into a many fold higher pressure level $P_2$ in the chamber 30. The duration of this very high pressure level $P_2$ in chamber 30 is so brief that it appears as a high energy shock wave in the liquid 30 in chamber 31 which produces plastic deformation of the work W against the die surface 16. The valves 38, 63, 68, 74, 80, 82 and 84 are solenoid valves which are connected by electrical circuits 98 to the main control means 99 for controlling these valves in proper sequence. This control means 99 includes a plurality of cam-actuated switches which are individually connected by the various circuits 98 to these respective solenoid valves. A plurality of cams are ganged onto a common shaft so that each cam can control a respective one of the switches to produce the desired duration of open and closed condition for each valve. A timing motor running at the desired speed drives the common cam shaft. The valve 48 is operated manually from time to time to supply the desired level of the liquid layer 30. When the main control means 99 has completed one full cycle, then the apparatus is ready to be fired again. The firing switch in the control means 62 is automatically actuated by one of the control cams in the main control means 99, and this firing will be explained in further detail in connection with FIGURE 4.

In the other embodiments of this invention the same elements have the same reference numbers as in FIGURE 1, and components performing functions corresponding to those of similar components in FIGURE 1 have the same reference number increased by multiples of 200. The hand tool 200 (FIGURE 2) is adapted to provide intense blows from a tool bit 201 which is detachably secured by a set screw 202 in a socket 203 in a pulse transmitting piston 240. Other shapes of tool bits can be inserted into the socket 203 depending upon the particular material forming operation being performed by this tool, for example such as forming material for forging, bending, indenting, riveting, chiseling, by driving or hammering harder elements into other material, for example studs into concrete, and the like.

In operating this hand tool 200 (FIGURE 2) the user holds a handle 204 and fires the tool by squeezing a trigger 205. The return of the operating elements to their initial positions is produced by allownig this trigger to move forward to its normal position as urged by a trigger spring (not shown). When the trigger is squeezed, an apparatus 60 abruptly releases a charge of high pressure gas into a release region 266 containing liquid 67 positioned between an impulse transformer piston 252 and a recoil absorbing piston 206. This recoil piston 206 has substantially more weight than the piston 252 and is normally held in its forward position against a stop shoulder 207 by means of a spring 208. This piston 206 slides back within a cylinder 209 when the tool 200 is fired, and at the rear of this cylinder is a tubular resilient stop pad 233. The air in the cylinder 209 is allowed to escape from behind the moving piston 206 through a port 237 and is deflected forwardly by a deflector shield 239. Thus, the outrush of air is kept away from the user's face or body.

The impulse transformer piston 252 accelerates forwardly at a high rate during its free travel along the bore 265 of the long cylinder 250, and is travelling at high velocity at the instant when it impacts against the surface 243 of the pulse transmitting piston 240. Thus, the tool bit 201 is driven forward substantially instantaneously to provide a high energy shock impulse to the work material W, which is shown here as a heavy section of metal being formed. As a result, plastic deformation of this work material W is produced to cause the desired forming of this material.

As the piston 252 accelerates forwardly at high rate, the air within the bore 265 is allowed to escape through a plurality of formally directed ports 302 which are located immediately adjacent to the impact surface 243 of the piston 240.

In order to return the piston 240 to its initial position, the trigger 205 is released. This opens a valve momentarily so that compressed air is supplied through a line 304 and through a passage 306 into a tool-return cylinder 308. The pressure of the air on a shoulder 310 of the piston 240 returns it to its initial position.

For purposes of returning the piston 252 to its initial position, the ports 302 are temporarily closed by means of a slidable sleeve 312 which is moved forward to cover these ports by a small double acting cylinder 314. Then, compressed air is fed through a return line 283 and through a passage 249 into the forward end of the bore 265 for returning the piston 252 to its initial position. The piston 252 is held in its initial position by a retainer detent spring ring 320 which engages in a groove extending around the piston 252.

The gas release apparatus 60 is secured by detachable mounting means 61 onto a cylinder body portion 251. During return of the pistons 252 and 206 to their initial positions, the gas which was previously released into the region 266 is allowed to escape into the atmosphere through a very small diameter passage 322 and through a gas-liquid separator 272. The passage 322 is so small that an insignificant amount of the high pressure gas can escape during the very brief instant while the piston 252 is accelerating forward in its impulse stroke. The liquid 67 is introduced into the region 166 through a passage 326.

After an appropriate time delay which is sufficient to return the pistons 252 and 206, the double-acting cylinders 314 are actuated to open the ports 302. This reverse movement of the sleeve 312 signals the user that the tool 200 is ready to be fired again.

It will be appreciated by those skilled in the art that the feeding of compressed air through the various lines 283, 304, and to the double-acting cylinders 314 is controlled by suitable solenoid valves in a housing 330. The trigger 203 operates switches to control these solenoid valves. The electrical power for energizing the solenoid valves is supplied by a power line 331. Low pressure air is fed through a line 332 for supplying the return lines 283 and 304 and for operating the double-acting cylinders 314. High pressure air for charging the apparatus 60 is fed through a line 333, and all three lines 331, 332, and 333 are encased in a flexible armored sheath 34.

The retainer detent ring 20 (FIG. 2), and the electromagnet coil 65 (FIG. 1) serve as means for holding the pulse transformer piston (52, 252) in its initial position. It will be understood that any similar holding means may be used which will retain the pulse transformer piston in its initial position and then will release it to be accelerated freely to a high velocity.

Figure 2:
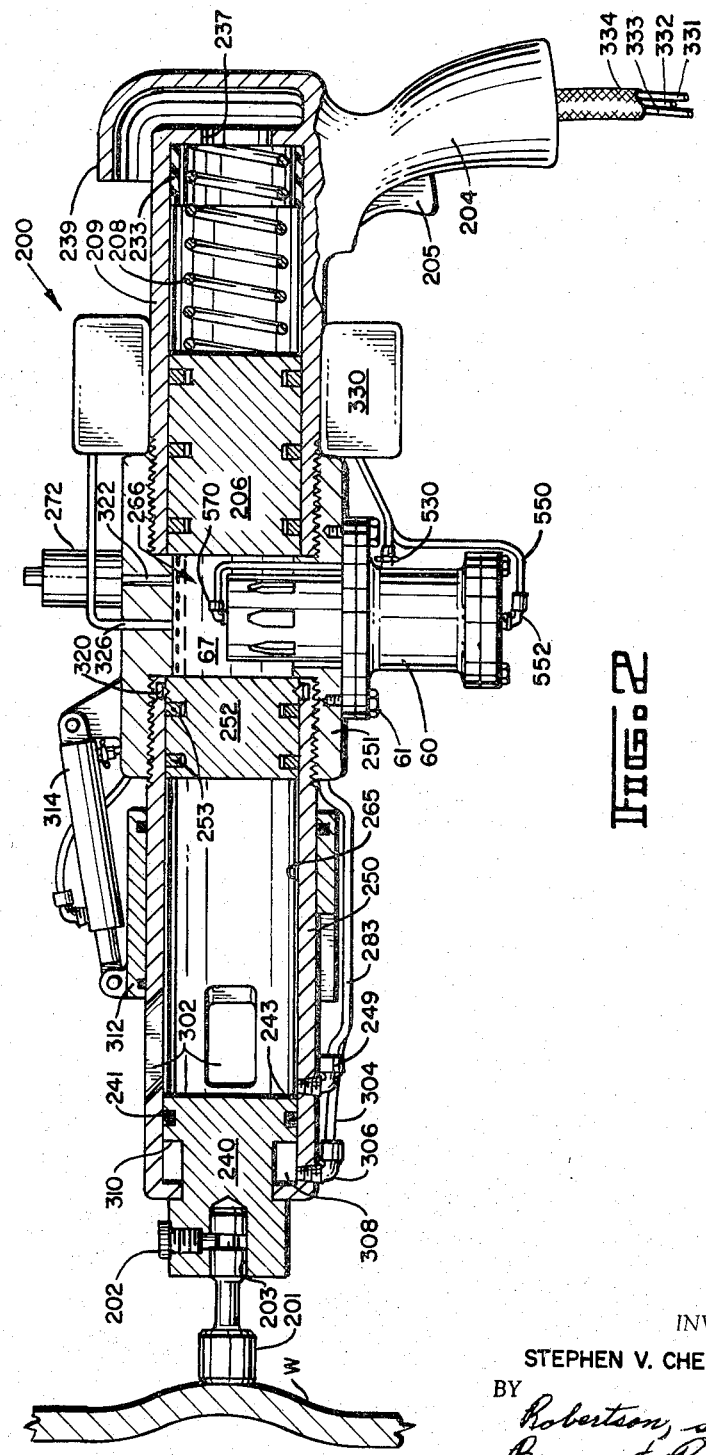
FIGURE 2 is an axial sectional view of a hand tool embodying this invention.

In FIGURE 2 the apparatus 60 for abruptly releasing the high pressure air is identical to that in FIGURE 1 except that it is smaller in size and is adapted to be charged with high pressure compressed air in a range from 400 to 3,000 p.s.i.

Figure 3:
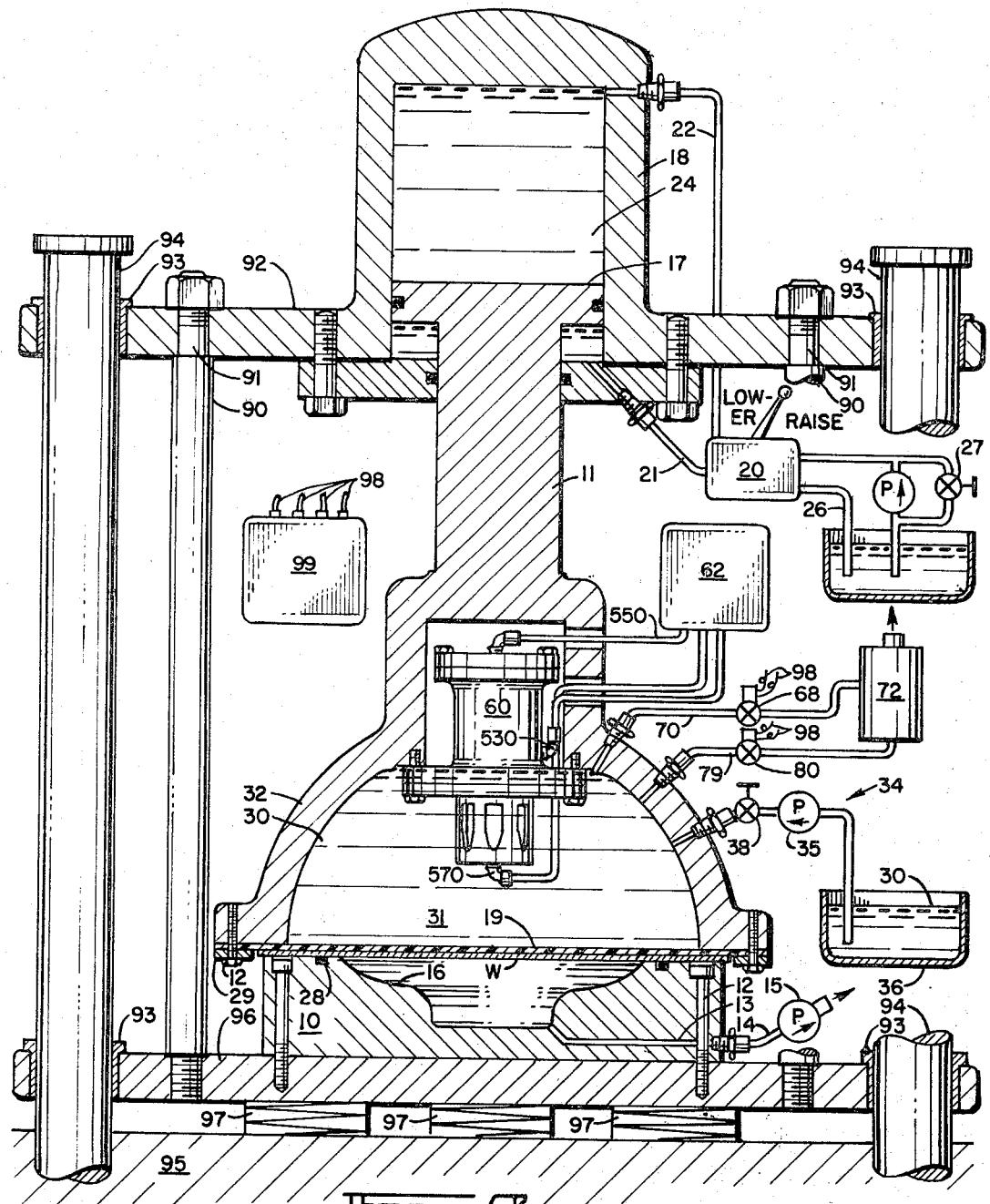
FIGURE 3 is an elevational sectional view of a modified apparatus for carrying out the process of this invention.

In FIGURE 3 is shown a modified system 400 for carrying out the process of this invention. The apparatus 60 is identical to that in FIGURE 1 and is adapted to release abruptly a charge of highly compressed gas directly into the chamber 30 for creating an intense pressure impulse in the liquid 30 which is effectively adjacent to the work material W. The incompressible fluid 30 is pre-pressurized by the high-pressure source means 34, which includes the pump 35 and valve 38. The work material W is shown as a metal plate to be formed against the die surface 16. After the high energy pressure impulse has been applied to the material W the gas is discharged through a valve 68, line 70 and gas-liquid separator 72. For forming thicker sections a succession of pulses can be applied before the work is unclamped.

The high pressure bell-shaped container 32 is held firmly in opposed relationship to the die 10 by pressurized liquid 24 within the cylinder 18 above the large piston 17. When the work has been formed, the container 32 and the movable support means 11 are raised by feeding hydraulic liquid through the line 21 into the lower portion of the cylinder 18. Thus, the formed work W can be removed and another plate positioned on the die 10 in readiness to be formed. The valves 68 and 80 are solenoid valves which are connected by circuits 98 to the main control means 99 for providing the desired sequence and duration of operation of these valves, similar to the control system described in connection with FIGURE 1.

Figure 4:
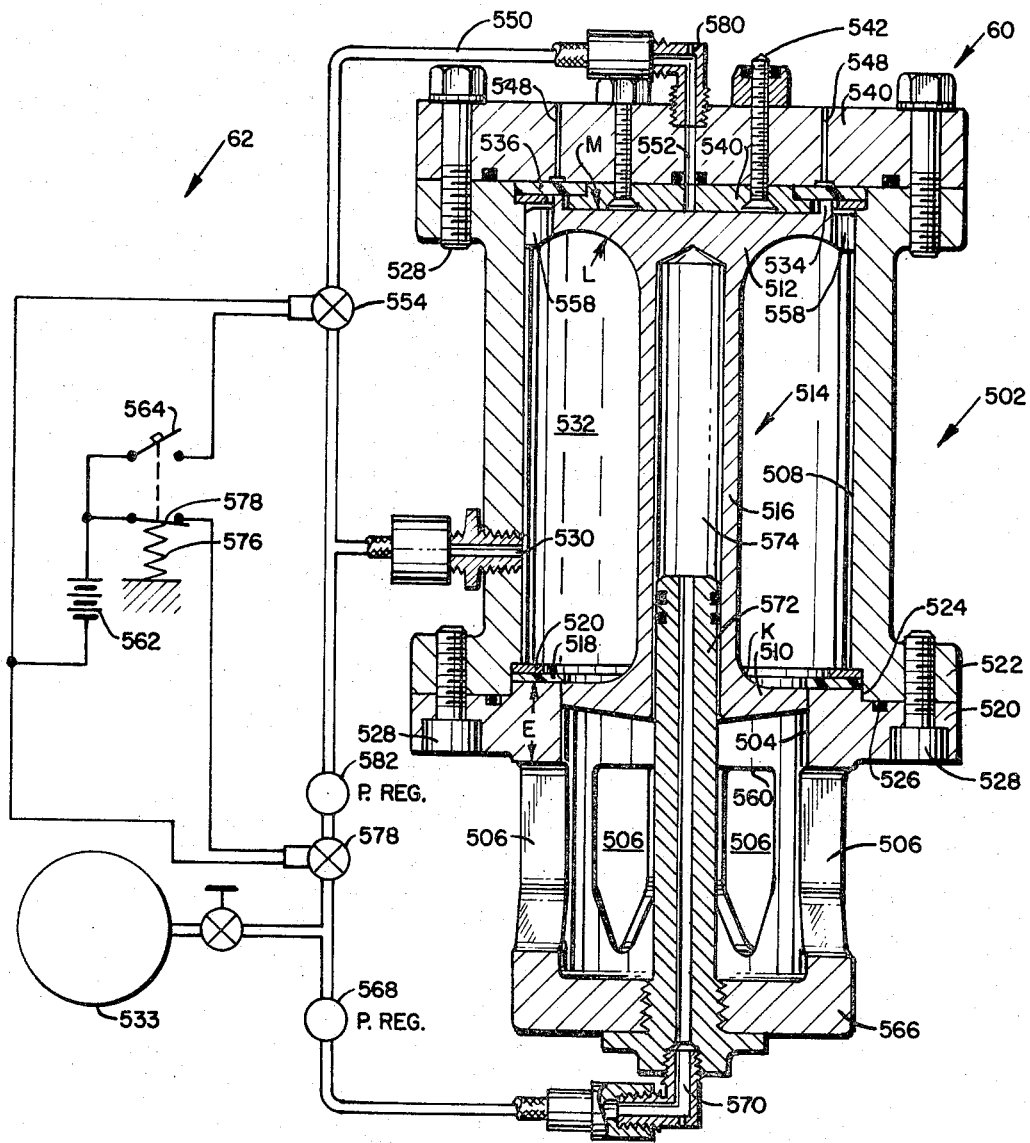
FIGURE 4 is an axial sectional view, shown on an enlarged scale, of apparatus for abruptly releasing compressed gas. This gas release apparatus is also shown in FIGURES 1, 2 and 3.

As shown in detail in FIGURE 4, the apparatus 60 for abruptly releasing gas comprises container means 502 adapted to hold gas therein under high pressure and to discharge the gas suddenly in a very brief time period in response to an external control signal. The container means 502 includes a plurality of axially aligned cylinders each having a piston in sliding engagement therewith. These pistons are rigidly interconnected so that they are capable of movement with very great acceleration over a predetermined distance before suddenly discharging the high-pressure gas through vent means from the apparatus 60. One of these pistons serves as opening and closing means for containing and then releasing the high pressure gas, and another piston serves as operating means for the first piston for holding it closed and then for releasing it in response to the external firing signal so that the pistons then move with very great acceleration before the first piston opens the vent means for discharging the high-pressure gas.

Consequently, the vent means are opened very abruptly, for the first piston is travelling very fast at the instant when the vent means are opened, thus advantageously providing an effectively instantaneous transition from fully closed to fully open condition.

As shown illustratively in FIGURE 4, the container means 502 includes a first cylinder 504 which extends toward vent means 506 and a second cylinder 508 which is axially aligned with the first cylinder 504. A first piston 510 travels along the cylinder 504 and serves as closing means for blocking the discharge port so as to contain the high-pressure gas within the container means 502.

For operating the first piston 510 there is a second piston 512 which travels along the cylinder 508, and these two pistons are rigidly interconnected to form a shuttle 514 which is constructed so as to be as light as possible while being sufficiently strong to withstand a very great acceleration and subsequent very great deceleration in the axial direction. A hollow piston rod 516 rigidly interconnects these two pistons 510 and 512.

When the shuttle 514 is in its normal position prior to firing, the first piston 510 is located at the upper end of the cylinder 504 remote from the vent means 506. The rim of this first piston 510 is in sealing engagement with a first annular resilient seal 518 which is clamped in place by a metal clamping retainer ring 520. The seal 518 is formed of a very tough, resilient material, for example, tough, solid polyurethane, and it has sufficient ability to be bent and yet to return to its original shape so as to enable it to be slid over the perimeter of the piston 510 when the shuttle 514 and seal 518 are being assembled and sufficient durability to withstand the operating conditions. From experiments I have found that it is desirable to machine the two pistons 510 and 512 and the hollow connecting rod 516 as an integral member so as to provide sufficient strength and durability to withstand the very great acceleration and deceleration forces and pressures encountered during operation repeatedly over thousands of operating cycles.

The cylinder 504 includes a strong flange 520 mating with a strong flange 522 on the lower end of the cylinder 508. The upper end of the cylinder 504 projects somewhat above the top surface of the flange 520 so as to form a lip engaging with the lower end of the upper cylinder for precisely aligning the two cylinders. The flange surface 520 has an annular groove containing an O-ring 526 abutting against the flange 522 preventing leakage of high pressure gas from the housing 502. A bolt circle 528 holds the flanges 520 and 522 tightly together.

In preparation for firing, gas under pressure, for example 1,000 to 10,000 p.s.i. is supplied from a high pressure source 533, such as a multi-stage compressor, through a fill port 530 into the chamber 532 within the cylinder 508. The pressure of the gas upon the upper surface K of the piston 510 is tending to drive this piston down along the cylinder 504.

In order to hold this piston in place, the second piston 512 has a surface L exposed to the pressure of gas in the container and of larger effective area than area K and facing in the opposite direction from area K. This second piston has an annular lip sealing element 534 engaging up against a second annular tough resilient seal 536. This seal 536 may be formed of the same material as the seal 518. A clamping retainer ring 538 holds the outer edge of the seal 536. The inner edge of the seal 536 is held by a retainer disc stop 540 having a rabbeted edge overlapping the seal. A plurality of bolts 542 secure the disc stop 540 against the cylinder head wall 544. This end wall 544 is fastened by a bolt circle 528 to a flange 546 on the cylinder 508. The wall 544 includes an annular groove containing an O-ring 526 for preventing leakage.

As will be explained, when the apparatus 60 is fired, the pressure within the chamber 532 drops very abruptly. Consequently, it is desirable to prevent the accumulation of any high pressure gas behind the seal 536, because any such pocket of gas would tend to blow the seal 115 away from the end wall 540 upon firing. Accordingly, a small diameter bleed hole 548 passes through the end wall 540 and communicates with a channel behind the seal 536. The outer diameter of the sealing lip element 534 is greater than the diameter of the piston 510. The upper surface M of the piston engages against the stop disc 540 as the lip 534 begins to press into the resilient seal 536. This stop 540 prevents the large thrust of the piston from embedding the lip element 534 deeply into the seal 536.

The shuttle 514 is in effect in unstable equilibrium, being temporarily held in place by the differential in areas, but as soon as the pressure nears equalization on opposite surfaces of the operating piston 512, then the shuttle is released and accelerates violently.

In order to fire the apparatus 60, communication is provided between the chamber 532 and the upper surface M of the piston 512 so as to tend to equalize the pressures against opposite sides L and M of the operating piston 512. A passage is completed from the fill port 530 through a line 550 to a firing port 552 by opening a solenoid actuated firing valve 554. There is a small chamber 556 surrounding the firing port 552 adjacent to the surface M, and the high pressure gas enters through the firing port into this chamber 556 thus tending to equalize the pressure against opposite surfaces M and L. The high pressure gas pressing against the surface K of piston 510 soon overbalances the holding force of the piston 512, so that the piston 510 begins to accelerate rapidly down the cylinder 504. Thus, the lip element 534 is moved away from the seal 536.

Immediately, the gas in the chamber 532 is free to rush up through multiple by-pass openings 558 in the scalloped periphery of the piston 512 so as to equalize completely the pressure against opposite sides M and L of this piston 99. The lands between the by-pass openings 558 serve as guide means travelling along the cylinder surface 508.

The two pistons 510 and 512 accelerate downwardly with very great acceleration along the acceleration distance E, but the high pressure gas is prevented from escaping through the vent means 506 until after the rim of the piston 510 has passed below the upper end of the vent means. The vent means 506 comprise a plurality of openings to the exterior of the housing means 502 communicating with the lower end of the cylinder 504, and the longitudinally extending areas between each of the vent openings serve as guide surfaces for guiding the piston 510.

As the piston 510 travels along the acceleration distance E, it accelerates extremely rapidly to a high velocity so that it passes the end 560 of the cylinder 504 extremely fast and traverses past the vents 506 almost instantaneously so that they become fully open in a small fraction of a second. The high pressure gas is thus released with effectively an extremely abrupt discharge which approcahes explosive abruptness.

The appartus 60 is operated and controlled by the supply and control means, generally indicated at 62, including the high pressure source 533. The firing valve 554 is a solenoid valve which is energized from a source of electrical energy 562 by closing a trigger switch 564. After the apparatus 60 has been discharged, the first piston 510 is down in the housing 566 near the lower ends of the vents 506, the shuttle 514 having been decelerated by the liquid 67 which is expelled from the lower end of the housing 566 through the vents 506. This piston deceleration is another function of the liquid 67, shown in FIGURES 1 and 2, and of the liquid 30 in FIGURE 3.

The shuttle 514 is returned to its initial position by gas from the source 533 which passes through a pressure reducer 568 and through a return passage 570 and up through a pedestal 572 into a return chamber 574 within the hollow piston rod 516. When the trigger switch 564 is released, a spring 576 opens this switch 564 and closes a fill switch 578 which is mechanically ganged with the trigger switch. Thus, a fill solenoid valve 578 is energized so as to supply gas through the fill port 530 for quickly recharging the apparatus 60. A bleed hole 580 communicating with the firing port 552 prevents any build up of pressure in the passage 552 so as to prevent accidental firing until the trigger switch 564 is actuated. The trigger switch 564 and the fill switch 578 may desirably be actuated by cam means which are included in the main control means 99, as is shown in the systems of FIGURES 1 and 3. Alternatively, the switches 564 and 578 may be manually actuated as indicated in the apparatus of FIGURE 2.

It will be appreciated that these methods and apparatus are very flexible in operation. A different pressure level in the chamber 532 can be used for each impulse when a succession of impulses are being used to form the work material W. The pressure level of the high pressure gas in the chamber 532 is adjusted by setting a pressure regulator valve 582.

Also, it is to be noted that these apparatus can be incorporated in existing presses as attachments thereto. The existing presses being used to provide the powerful clamping forces which are here being provided by the large piston 17 and cylinder 18.

From the foregoing it will be understood that the material forming methods and apparatus of the present invention described above are well suited to provide the advantages set forth, and since many possible embodiments may be made of the various features of this invention and as the method and apparatus herein described may be changed in various parts, all without departing from the scope of the invention, it is to be understood that all matter hereinbefore set forth or shown in the accompanying drawings is to be interpreted as illustrative and not in a limiting sense and that in certain instances, some of the features of the invention may be used without a corresponding use of other features, all without departing from the scope of the invention as defined by the following claims.

What is claimed is:

1. The process of shaping material by the application of high energy impulses to the material comprising the steps of placing the material adjacent to a die, confining liquid adjacent to the material in opposed relationship to said die, said liquid being confined in impulse transmitting relationship with said material, compressing air under high pressure, abruptly releasing the compressed air generating a high energy impulse in the liquid applied to said material for shaping said material against said die, compressing further air under high pressure, and abruptly releasing the further air generating a high energy impulse in the liquid applied to said material for further shaping said material against said die.

2. The process of shaping a plate of material comprising the steps of placing the plate of material near a die surface, confining liquid adjacent to the plate on the opposite side of said plate from said die and in pressure applying relationship with said plate, pre-pressurizing the confined liquid for stressing the plate toward said die, compressing air under high pressure, abruptly releasing the compressed air generating a high energy impulse in the confined pre-pressurized liquid applied against the stressed plate for shaping said plate against the die surface.

3. The process of shaping a plate of material as claimed in claim 2 wherein abruptly releasing the compressed air accelerates a free travel piston along a cylinder extending to the confined pre-pressurized liquid for generating a high energy impulse in the confined pre-pressurized liquid upon impact of the accelerated piston upon the confined pre-pressurized liquid.

4. The process of forming material comprising the steps of placing an impulse transmitting medium adjacent to the material to be formed, extending a cylinder from a distance to said impulse transmitting medium, positioning a free travel piston in said cylinder at a distance from said transmitting medium, compressing air under high pressure, abruptly releasing the high pressure air behind said free travel piston accelerating said piston toward said transmitting medium, and impacting said piston at high velocity against said transmitting medium for applying a high energy impulse to said material for forming said material.

5. Apparatus for shaping material by sudden impulses comprising rigid chamber means, liquid supply means introducing liquid into said chamber means, mounting means for holding the material to be shaped adjacent to the liquid in said chamber means with said liquid in pressure applying relationship to the material to be shaped, air compressing means, container means for holding the compressed air, and abrupt release means for suddenly releasing the compressed air generating an intense high pressure impulse in said liquid applied to the material for shaping the material.

6. Apparatus for shaping material by sudden impulses comprising die means, rigid chamber means, clamp means for holding the material between said die means and said chamber means, liquid supply means introducing liquid into said chamber means adjacent to said material in pressure applying relationship with the material to be shaped, air compressing means, container means for holding the compressed air and instantaneous air release means for abruptly releasing the compressed air generating an intense high pressure impulse in said liquid applied to the material for shaping the material.

7. Apparatus for shaping material by sudden impulses comprising die means, rigid chamber means, clamp means for holding the material between said die means and said chamber means, liquid supply means introducing liquid into said chamber means adjacent to said material, a cylinder extending from a distance to said chamber means, a free travel piston positionable in said cylinder at a distance from the liquid in said chamber means, said piston being freely movable for high acceleration, air compressing means, container means for holding the compressed air and instantaneous air release means abruptly releasing the compressed air into a region behind said piston accelerating said piston generating an intense impulse in said liquid upon impact of said piston upon the liquid in said chamber means.

8. Apparatus for shaping material by high energy impulses comprising rigid wall means having flexible diaphragm means secured thereto defining a chamber within said wall means behind said diaphragm means, liquid supply means introducing liquid into said chamber, mounting means for holding the material to be shaped adjacent to said diaphragm means on the opposite side thereof from the liquid in said chamber, air compressing means, container means for holding the compressed air, and abrupt release means for suddenly releasing the compressed air generating an intense impulse in said liquid for applying a high energy impulse through said diaphragm means to the material to shape said material.

9. The process of shaping material by the application of high pressure impulses of brief duration to the material comprising the steps of confining a substantially incompressible liquid in a rigid container adjacent to the material to be shaped, positioning a movable mass at a distance from said liquid, applying a first pressure impulse ($I_1$) having a first pressure level ($P_1$) and a first time duration ($T_1$) to said movable mass for accelerating said mass to high velocity toward said liquid, effectively impacting said mass against said liquid generating a second high pressure impulse ($I_2$) in said liquid having a second pressure level ($P_2$) which is higher than $P_1$ and of brief time duration ($T_2$) which is shorter than $T_1$, and applying said second high pressure impulse $I_2$ to said material for shaping said material.

10. Apparatus for forming material by application of sudden high pressure impulses to the material comprising rigid wall means defining a chamber, liquid supply means for introducing liquid into said chamber, holding means for holding the material to be formed adjacent to the liquid in said chamber, said rigid wall means having movable pulse transmitting means, a movable mass positionable at a distance from said pulse transmitting means, said mass being freely movable for high acceleration toward said pulse transmitting means, air compressing means, container means for holding the compressed air, and instantaneous air release means abruptly releasing the compressed air into a region behind said mass for accelerating said mass, said mass impacting at high velocity against said pulse transmitting means for generating an intense impulse in said liquid upon impact of said mass.

11. Apparatus for forming material by application of sudden high pressure impulses to the material comprising rigid wall means defining a chamber, liquid supply means for introducing liquid into said chamber, holding means for holding the material to be formed adjacent to the liquid in said chamber, said rigid wall means including pulse transmitting means movable toward the liquid in said chamber, a cylinder extending toward said movable pulse transmitting means, a free travelling piston positionable in said cylinder at a distance from said pulse transmitting means, said piston being freely movable for high acceleration along said cylinder toward said pulse transmitting means, and means for abruptly generating high pressure gas behind said piston for accelerating said piston along said cylinder, said piston impacting at high velocity against said pulse transmitting means for generating an intense impulse in said liquid upon impact of said piston for forming said material.

12. Apparatus for forming material by application of sudden high pressure impulses to the material comprising rigid wall means defining a chamber, means for introducing liquid into said chamber, holding means for holding the material to be formed adjacent to the liquid in said chamber, pressurizing means pre-pressuring the liquid in said chamber for pre-stressing material, said rigid wall means having movable pulse transmitting means, a movable mass positionable at a distance from said pulse transmitting means, said mass being freely movable for high acceleration toward said pulse transmitting means, means abruptly generating high pressure gases in a region behind said mass for accelerating said mass toward said pulse transmitting means, said mass impacting at high velocity against said pulse transmitting means for generating an intense impulse in said liquid upon impact of said mass applying said intense pulse to said pre-stressed material for forming said material.

13. Apparatus for forming material by application of sudden high pressure impulses to the material comprising rigid wall means defining a chamber, liquid supply means for introducing liquid into said chamber, holding means for holding the material to be formed adjacent to the liquid in said chamber, said rigid wall means including pulse transmitting means movable toward the liquid in said chamber, a cylinder extending toward said movable pulse transmitting means, a free travelling piston positionable in said cylinder at a distance from said pulse transmitting means, said piston being freely movable for high acceleration along said cylinder toward said pulse transmitting means, means for removing gas from said cylinder between said piston and said pulse transmitting means, and means for abruptly generating high pressure gas behind said piston for accelerating said piston along said cylinder, said piston impacting at high velocity against said pulse transmitting means for generating an intense impulse in said liquid upon impact of said piston for forming said material.

14. Apparatus for forming material by application of a sudden intense pressure impulse to the material comprising rigid wall means defining a chamber, liquid supply means for introducing liquid into said chamber, holding means for holding the material to be formed in impulse receiving relationship with the liquid in said chamber, a cylinder extending to and being connected with said chamber, a free traveling piston initially positionable in said cylinder at a distance from said chamber, said piston being freely movable for high acceleration along said cylinder toward the liquid in said chamber, means abruptly providing high pressure gas in said cylinder behind said piston for accelerating said piston along said cylinder to a high velocity toward the liquid in said chamber, said piston applying an impact to the liquid in said chamber for generating a sudden intense pressure impulse in the liquid applied to the material to be formed, and said piston being returnable to the initial position in said cylinder at a distance from said chamber and repeating the operation.

References Cited
UNITED STATES PATENTS

| | | | |
|---|---|---|---|
| 2,385,083 | 9/1945 | Kemerer | 72—63 |
| 3,057,131 | 10/1962 | Setser | 72—56 |
| 3,090,113 | 5/1963 | Karpovich | 72—56 |
| 3,267,710 | 8/1966 | Inoue | 72—56 |

CHARLES W. LANHAM, *Primary Examiner.*

K. C. DECKER, *Assistant Examiner.*